(12) United States Patent
Dasylva et al.

(10) Patent No.: US 7,684,333 B1
(45) Date of Patent: Mar. 23, 2010

(54) RELIABLE QUALITY OF SERVICE (QOS) PROVISIONING USING ADAPTIVE CLASS-BASED CONTENTION PERIODS

(75) Inventors: Abel Clement Dasylva, Ottawa (CA); Zhonghui Yao, Kanata (CA); Delfin Montuno, Kanata (CA); Michel Ouellette, Orleans (CA); James Aweya, Kanata (CA); Wenfeng Chen, Kanata (CA); Kent Felske, Kanata (CA)

(73) Assignee: AVAYA, Inc., Basking Ridge, NJ (US)

( * ) Notice: Subject to any disclaimer, the term of this patent is extended or adjusted under 35 U.S.C. 154(b) by 586 days.

(21) Appl. No.: 11/191,485

(22) Filed: Jul. 28, 2005

Related U.S. Application Data (60) Provisional application No. 60/600,986, filed on Aug. 12, 2004, provisional application No. 60/593,011, filed on Jul. 30, 2004.

(51) Int. Cl.
*H04L 5/12* (2006.01)
*G01R 3/08* (2006.01)
*G06F 11/00* (2006.01)
*G08C 15/00* (2006.01)

(52) U.S. Cl. ............... 370/235.1; 370/395.4; 370/445; 370/468

(58) Field of Classification Search ............. 370/235.1, 370/445, 468, 395.4
See application file for complete search history.

(56) References Cited

U.S. PATENT DOCUMENTS 6,757,249 B1 * 6/2004 Kejriwal et al. .......... 370/235.1

2005/0058151 A1 * 3/2005 Yeh ........................... 370/445
2005/0169307 A1 * 8/2005 Ayyagari et al. ............ 370/468
2007/0195787 A1 * 8/2007 Alnuweiri et al. ......... 370/395.4

OTHER PUBLICATIONS

ANSI/IEEE Std 802.11, 1999 Edition; "Information Technology—Telecommunications and Information Exchange Between Systems—Local and Metropolitan Area Networks—Specific Requirements—Part 11: Wireless LAN Medium Access Control (MAC) and Physical Layer (PHY) Specifications"; Aug. 20, 1999; 520 pages.

IEEE 802 Committee; "Draft Amendment to Standard [for] Information Technology—Telecommunications and Information Exchange Between Systems—LAN/MAN Specific Requirements—Part 11: Wireless Medium Access Control (MAC) and Physical Layer (PHY) Specifications: Medium Access Control (MAC) Quality of Service (QoS) Enhancements"; 2004 IEEE Standards Department; 182 pgs.

Dasylva, A. et al.; "Class-based Contention Periods (CCP) for the 802.11n MAC"; Aug. 25, 2004; 27 pgs.

* cited by examiner

*Primary Examiner*—William D Cumming
(74) *Attorney, Agent, or Firm*—Douglas Grover (57) ABSTRACT

A method and system for allocating bandwidth of a wireless channel to different types of traffic includes partitioning the bandwidth of the wireless channel into a plurality of contention periods. Traffic flows are associated with access categories, and one or more of the access categories are assigned to each contention period. During at least one of the contention periods, traffic flows associated with a proper subset of the access categories contend for access to the wireless channel.

20 Claims, 7 Drawing Sheets

RELIABLE QUALITY OF SERVICE (QOS) PROVISIONING USING ADAPTIVE CLASS-BASED CONTENTION PERIODS

RELATED APPLICATIONS

This application claims the benefit of the filing date of U.S. Provisional Application Ser. No. 60/593,011, filed Jul. 30, 2004, titled "Reliable QoS Provisioning Through Class-Based Contention," and of the filing date of U.S. Provisional Application Ser. No. 60/600,986, filed Aug. 12, 2004, titled "Adaptive Class-Based Contention Periods." The entireties of both such provisional applications are incorporated by reference herein.

FIELD OF THE INVENTION

The invention relates generally to wireless communication networks. More specifically, the invention relates to the use of class-based contention periods for allocating the bandwidth of a wireless channel to traffic flows.

BACKGROUND

Wireless local and personal (WLAN/WPAN) area networks are rapidly increasing in homes, enterprises, and public access environments. A number of access technologies, commonly known as Wi-Fi technologies, have arisen to meet this demand. Wi-Fi technologies can support diverse applications, including voice over internet protocol (VoIP), high quality video, and Internet access. IEEE Standards, such as the IEEE 802.11 group in the United States, has developed various standards to promote the efficient use of the wireless spectrum and the inter-operability between wireless access equipments from different vendors.

Homes, enterprises, and public access environments have different application requirements. A mix of high-bandwidth multimedia applications, including video, may predominate among home applications, whereas voice, email, and data applications may be more typical of the type of traffic found in enterprises. As the amount of traffic increases on wireless LANs, high-priority and real-time traffic can become less reliable because nodes in the wireless network contend with one another to determine which node can commence transmission. Consequently, quality of service (QoS) mechanisms are necessary to ensure reliable delivery of high-priority and real-time transmissions.

The 802.11e draft standard provides two mechanisms for supporting QoS, called Enhanced Distributed Channel Access (EDCA) and HCF Controlled Channel Access (HCCA). The standard divides the access time to the wireless medium into contention free periods (CFPs) and contention periods (CPs). The HCCA functions provide controlled channel access during contention free periods, whereas the EDCA functions provide contention-based access during contention periods.

During a contention free period, a point coordinator (e.g., an access point) controls access to the wireless channel through polling. The polling mechanism of HCCA ensures a minimum bandwidth to each node that requests to be added to a polling list managed by the point coordinator. The point coordinator polls each node, one at a time, in order to grant that node permission to transmit on the wireless channel, thus avoiding contention between transmitting nodes. A contention period begins after the point coordinator polls every node on the polling list.

During contention periods, nodes gain access to the wireless channel through contention resolved in accordance with a Carrier Sense Multiple Access with Collision Avoidance (CSMA/CA) algorithm. Between contending traffic flows, EDCA gives priority to nodes transmitting high-priority traffic. For example, a node offering high-priority VoIP traffic has an advantage during contention over a personal computer that is downloading a file (i.e., low-priority data traffic). A disadvantage of EDCA, however, is that high-priority traffic can effectively prevent low-priority traffic, such as data traffic, from gaining access to the wireless medium. Although data traffic is generally tolerant of delay, in order to minimize the number of TCP timeouts and to meet user expectations there should be a bound on the length of this delay.

SUMMARY

In one aspect, the invention features a method of allocating bandwidth of a wireless channel to different types of traffic. The bandwidth of the wireless channel is partitioned into a plurality of contention periods. Traffic flows are associated with access categories, and one or more of the access categories are assigned to each contention period. During at least one of the contention periods, traffic flows associated with a proper subset of the access categories contend for access to the wireless channel.

In another aspect, the invention features a wireless network including a station for transmitting packets over a wireless medium and an access point in wireless communication with the station over the wireless medium. The access point executes software to (1) partition the bandwidth of the wireless medium into a plurality of contention periods, (2) associate traffic flows with access categories, and (3) assign one or more of the access categories to each contention period such that during at least one of the contention periods traffic flows associated with a proper subset of the access categories contend for access to the wireless medium.

In still another aspect, the invention features an access point for use in a wireless network. The access point includes a processing unit and software executable by the processing unit to (1) partition the bandwidth of the wireless medium into a plurality of contention periods, (2) associate traffic flows with access categories, and (3) assign one or more of the access categories to each contention period such that during at least one of the contention periods traffic flows associated with a proper subset of the access categories contend for access to the wireless medium.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In general, systems and methods embodying the present invention allocate bandwidth of a wireless channel to different types of traffic flows in a wireless network, e.g., a wireless local or personal area network (WLAN, WPAN). The bandwidth of the wireless channel is partitioned into contention periods. The contention periods can have the same or different durations, which can be fixed or dynamically adjustable, e.g., based on the current traffic load of the contention period.

The different types of flows of traffic, e.g., voice, video, and data, are classified into access categories. These access categories correspond to different levels of priority for the different types of traffic flows. For example, an access category for voice traffic can have a higher priority than an access category for data traffic. Each access category is assigned to one or more contention periods, with one or more access categories being assigned to any given contention period.

When multiple access categories are assigned to the same contention period, traffic flows associated with those access categories may contend for the wireless channel during that contention period. When only one access category is assigned to a contention period, traffic flows of that access category only may contend for the wireless channel during that contention period. Assigning only one access category to a contention period ensures that the associated type of traffic receives some channel bandwidth.

Different mechanisms can be used to achieve differentiated throughput and delays for traffic flows associated with different access categories. In one embodiment, a traffic flow associated with a high-priority access category is permitted access to the wireless channel during a greater number of contention periods than is a traffic flow associated with a low-priority access category. For example, real-time traffic (e.g., voice) can be permitted to contend for the wireless channel in every contention period, while delay-tolerant traffic (e.g., data) can be permitted to contend during only one contention period. In another embodiment, contention periods can have different durations. Higher-priority access categories can be assigned to contention periods of longer duration.

A scheduling mechanism is applied to the contention periods, for determining an order in which the classes of traffic flows can contend for access to the wireless channel. Examples of scheduling mechanisms include, but are not limited to strict priority (SP), round robin (RR), and weighted round robin (WRR). The applied scheduling mechanism can be fixed or dynamically changeable, e.g., based on the type of service being supported.

Figure 1:
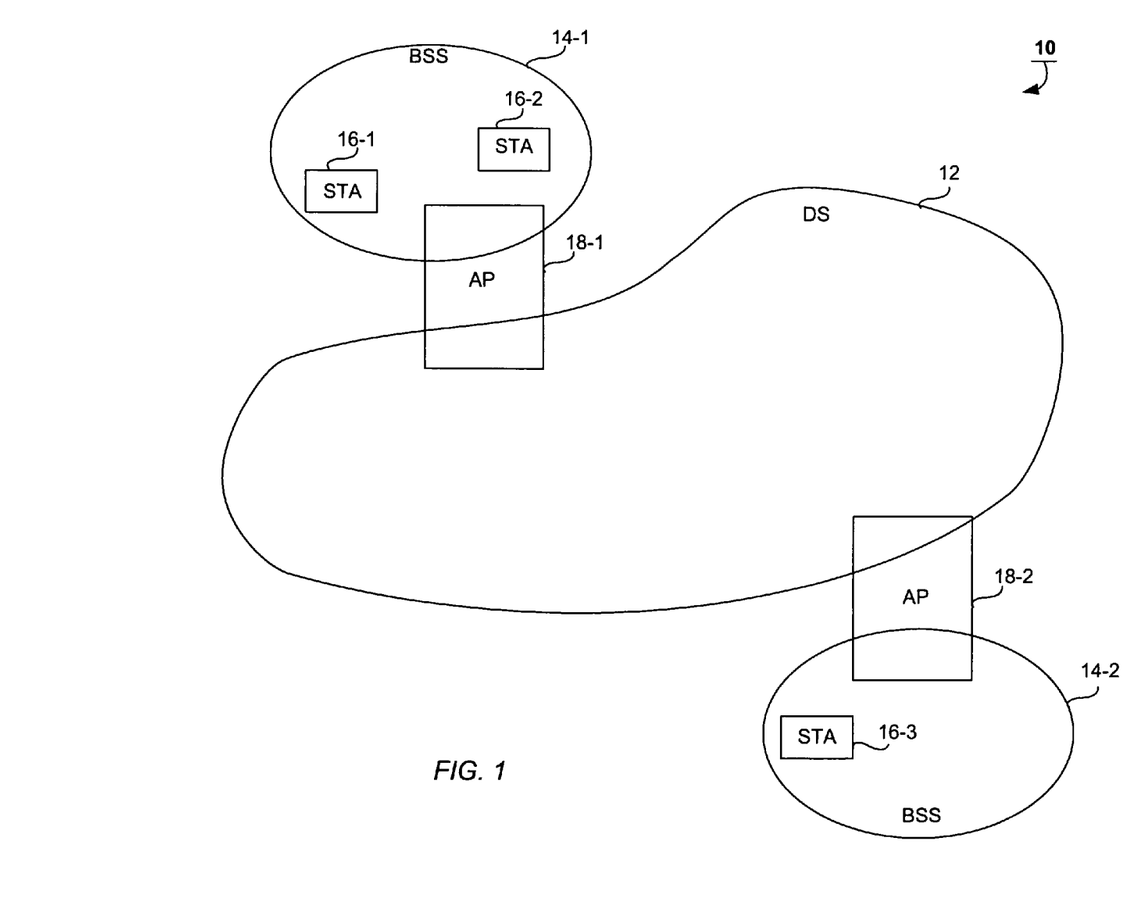
FIG. 1 is a block diagram of an exemplary wireless networking environment in which aspects of the invention may be implemented, the exemplary wireless networking environment including a plurality of basic service sets (BSS) in communication with a distribution system (DS).

FIG. 1 shows an embodiment of a wireless networking environment 10 in which aspects of the invention may be practiced. The networking environment 10, which can be, for example, a WLAN or a WPAN, can have arbitrary size and complexity. In this embodiment, the wireless networking environment 10 includes a distribution system (DS) 12 interconnecting a plurality of basic service sets (BSS) 14-1, 14-2 (generally, 14). Each BSS 14 includes one or more wireless stations 16 and represents a coverage area. Within the coverage area of a given BSS, each station 16 may remain in communication with each other station 16 in that BSS. For example, BSS 14-1 includes two wireless stations 16-1 and 16-2, whereas BSS 14-2 has one wireless station 16-3. Stations 16 are addressable message destinations that can be portable or mobile, and consequently can move within and outside of the coverage of a particular BSS. Each station is a device (e.g., a laptop computer) that contains an IEEE 802.11 conformant medium access control (MAC) layer and physical layer (PHY) interface to a wireless medium (WM)—hereafter, also referred to as a wireless channel. Stations 16 use the wireless medium to transfer data between peer PHY entities within a given BSS. To minimize collisions and provide quality of service (QoS), the MAC layer manages access to the wireless medium by the different stations 16 and uses the data delivery services of the PHY layer.

Multiple BSSs can overlap and exchange communications among themselves or with wired networks through access points (AP) 18. An access point (AP) is an addressable wireless station that provides access to the DS 12 by providing distribution system services (DSS) in addition to functioning as a wireless station 16. Hereafter, a general reference to stations includes access points, unless specifically referred to by reference numeral. Data move between each BSS 14 and the DS 12 by way of one of the APs 18. For example, in FIG. 1, data from the stations 16-1, 16-2 pass to the DS 12 by way of the access point 18-1, and from the station 16-3 to the DS 12 by way of the access point 18-2. The DS 12 uses a distribution system medium (DSM) for communications between APs 18. The DSM is considered logically separate from the WM, although, physically, the DSM and WM can be the same or different media.

To support QoS provisioning, stations implement a variation of the 802.11e EDCA, referred to hereafter as modified EDCA (or m-EDCA), as described herein. The m-EDCA functions employ the CSMA/CA algorithm to resolve contentions between applications vying for the wireless channel. Each station maintains two internal state variables: a back-off counter and a contention window. After each frame transmission, whether or not the transmission is successful, the station resets the back-off counter to a random integer value that is uniformly distributed over the length of the contention window. To minimize collisions between stations, the contention window is doubled, up to a maximum value, whenever a frame collision occurs, otherwise the contention window is reset to a given minimum value. A frame is successfully transmitted if an acknowledgment is received at the source station within a specified period.

When a station does not transmit a frame, that station listens to the wireless channel and decrements its back-off counter by one unit in each slot following a period of minimum length (called Arbitration Inter Frame Spacing, AIFS) during which the wireless channel has been continuously sensed idle. The station acquires the right to transmit a frame when the back-off counter reaches zero. When the station senses that the wireless channel is busy, in one embodiment the station freezes the back-off counter. Instead of freezing the back-off counter, the station can decrement the back-off counter although the wireless channel is sensed busy.

To provide differentiated QoS, the m-EDCA provides a plurality of access categories (ACs), e.g., four, with different contention parameters. These contention parameters include the minimum Contention Window (CW), the AIFS, the TXOP length, and the maximum frame length. The m-EDCA also partitions the bandwidth of the wireless channel into a plurality of contention periods and assigns one or more of the access categories to each contention period. Such contention periods are also referred to as class-based contention periods.

During a given contention period, those stations offering traffic associated with at least one access category assigned to that contention period contend with each other to determine which station can transmit. An additional priority mechanism enables individual stations to resolve internal collisions among traffic from different access categories that are assigned to the same contention period. The internal collision resolution enforces strict priority among these access categories.

In one embodiment, the m-EDCA is the sole mechanism used by the stations to provision QoS, that is, the full bandwidth of the wireless channel is divided into contention periods. In other embodiments, the m-EDCA is employed in conjunction with at least one other QoS mechanism, e.g., HCCA. For example, a first portion of the channel bandwidth can be used for the contention free period of HCCA and a second portion for the plurality of class-based contention periods of m-EDCA.

Figure 2:
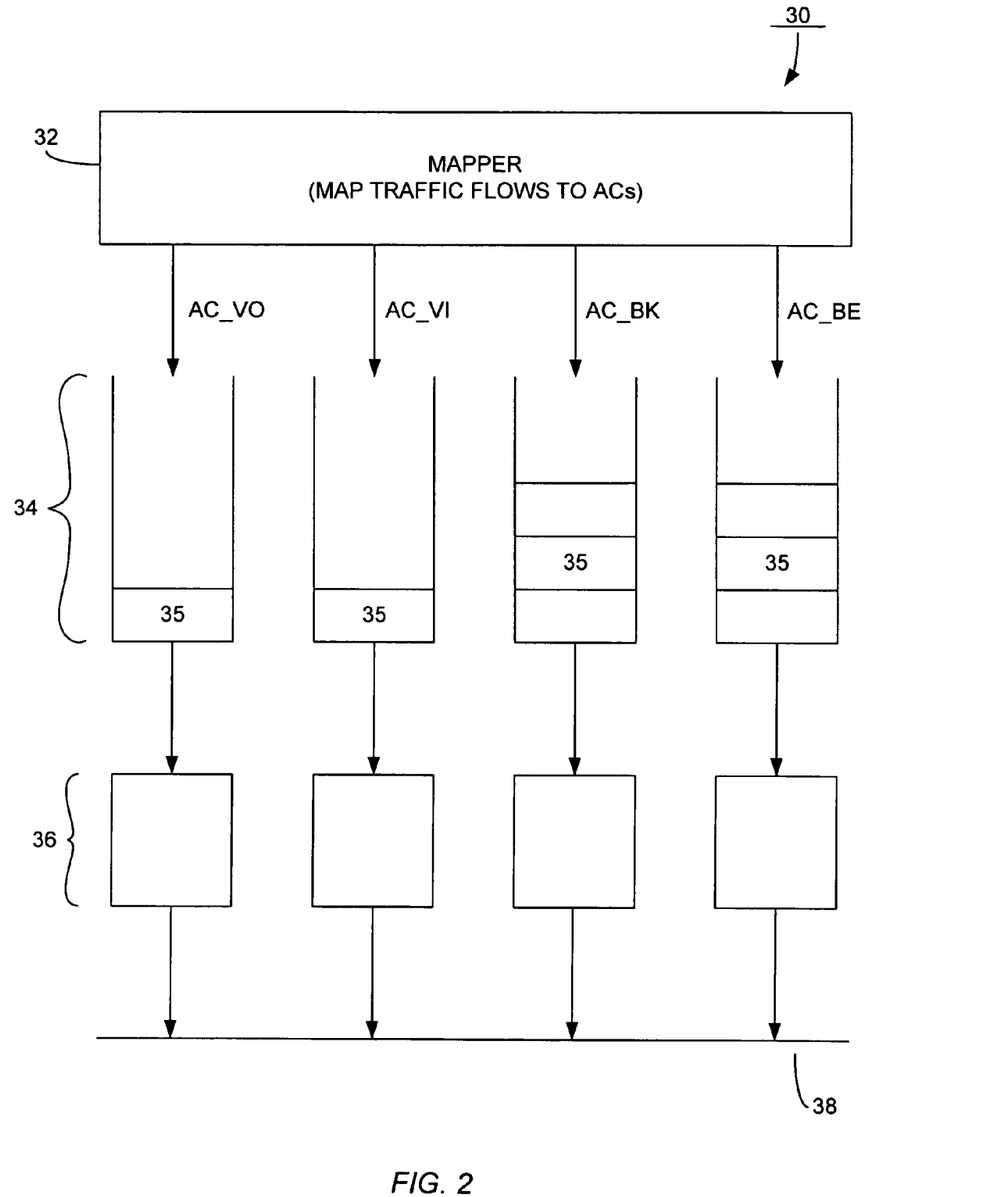
FIG. 2 is a block diagram of an exemplary architecture used by stations and access points to implement class-based contention periods.

FIG. 2 shows an exemplary architecture 30 implemented by stations 16 and access points 18 for provisioning QoS. The architecture 30 includes a mapper 32, for mapping traffic flows to access categories, and a plurality of queues 34. A plurality of priority levels (e.g., eight) is available for association with the traffic flows. In the example shown, there are four access categories, labeled AC_VO, AC_VI, AC_BK, and AC_BE. Access category AC_VO is associated with voice traffic, AC_VI with video traffic, AC_BK with background data traffic, and AC_BE with best-effort data traffic. The types of applications that can be classified into each of these categories are illustrated in Table 1. Other types and different numbers of access categories can be defined without departing from the principles of the invention.

TABLE 1

| Access Category | Application |
| --- | --- |
| AC_VO | VoIP |
| AC_VI | DV audio/video |
| | SDTV |
| | HDTV (Video/Audio) |
| | DVD |
| | Video Conf |
| | Internet Streaming video/audio |
| | Internet Streaming audio |
| | MP3 Audio |
| | Interactive Gaming |
| | NetMeeting application/Desktop sharing |
| | Videophone |
| AC_BK | VoD control channel |

TABLE 1-continued

| Access Category | Application |
| --- | --- |
| AC_BE | Local file transfer, printing |
| | Remote User Interface |
| | Content download |
| | Internet File transfer |

Associated with each access category is one queue 34. Each queue 34 is in communication with an independent channel access function 36 for providing frames 35 thereto. Each channel access function 36 implements the m-EDCA contention algorithm. When frames are available in multiple queues 34 contention for the wireless medium 38 occurs internally (between queues 34) and externally (between stations)—provided the frames are associated with access categories contending for the same contention period. Internal contention is resolved by allowing the frame with higher priority to transmit—provided the station has also won external contention—while the channel access function 36 for the lower priority frame invokes a queue-specific back-off.

Various parameters define m-EDCA operation. Such parameters include a minimum idle delay before contention, and minimum and maximum contention windows. The stations 16 store parameter values locally. The parameter values differ for each access category (queue). The access point 18 determines each access category and the length of each contention period, assigns each access category to one or more contention periods, and advertises the access categories to the stations in the BSS. Access points 18 also broadcast the parameter values for each access category to the stations 16 and can dynamically update them. This enables an access point to manage the overall QoS performance.

The station that wins a contention is granted the right to use the wireless medium for a specified period, referred to as a Transmission Opportunity or TXOP. The duration of the TXOP is specified for each access category (and is included in the parameter set). To minimize contention overhead, a station can transmit multiple frames in a TXOP after winning access to the wireless channel, but must ensure that sufficient time remains in the TXOP to transmit the frames and to receive any required acknowledgement.

Figure 3A:
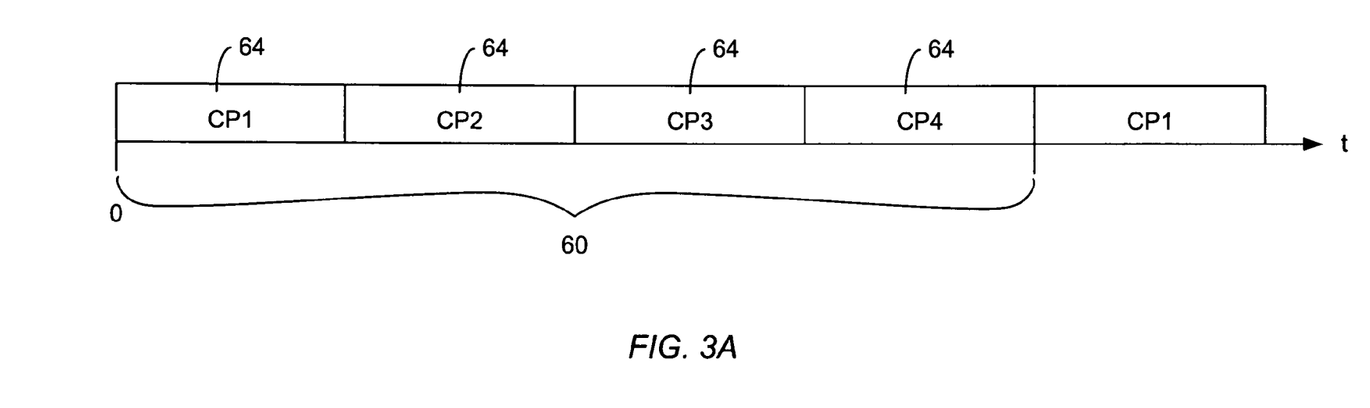
FIG. 3A is a diagram illustrating an exemplary partitioning of the bandwidth of the wireless channel into contention periods of equal duration.
Figure 3B:
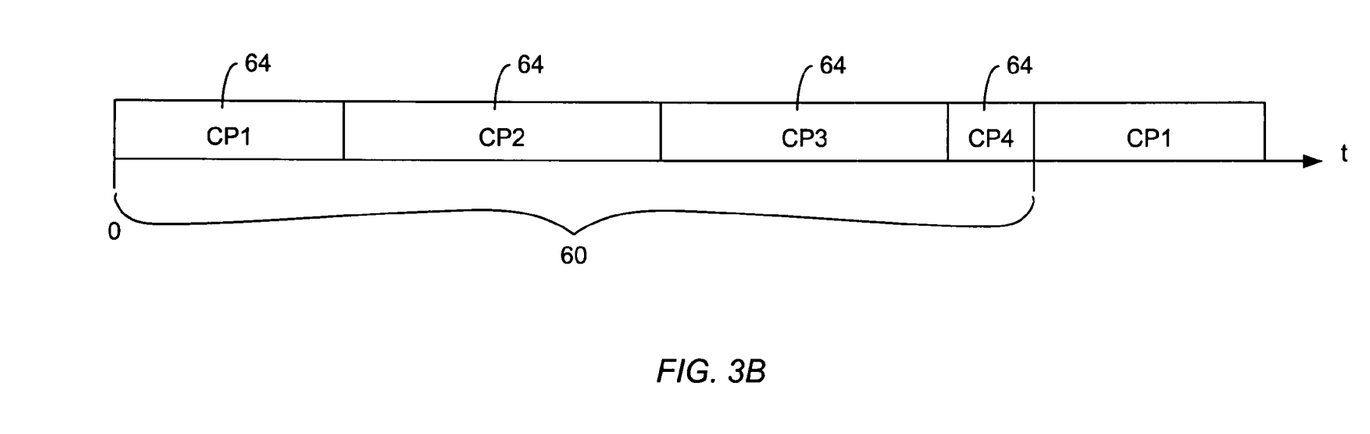
FIG. 3B is a diagram illustrating an exemplary partitioning of the bandwidth of the wireless channel into contention periods of different durations.

FIGS. 3A-3B show an exemplary partitioning of bandwidth 60 of the wireless transmission medium into a plurality of class-based contention periods 64. Here, for example, the bandwidth 60 is partitioned into four contention periods CP1, CP2, CP3, and CP4 (generally, contention period 64). A scheduling mechanism, such as round robin, determines the order of occurrence of the contention periods. A single scheduled round comprises the shown sequence of these four contention periods. Subsequent scheduled rounds follow the same sequence. In FIG. 2A, the contention periods 64 are each of equal duration and in FIG. 2B, the contention periods 64 have different durations. Appropriate control frames (not shown) indicate the start and stop of each contention period 64.

Figure 4:
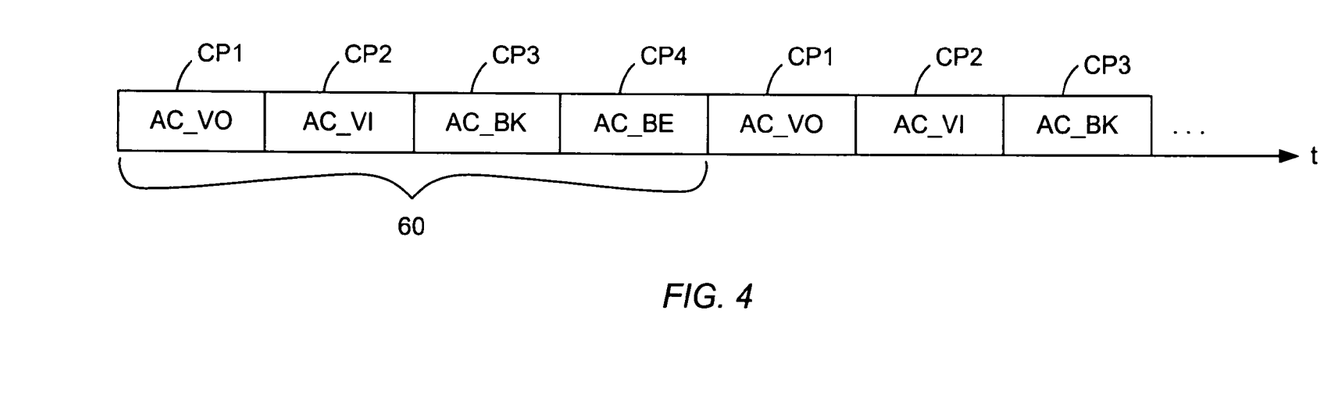
FIG. 4 is a diagram illustrating an exemplary assignment of access categories to contention periods of equal duration, with one access category being assigned to each contention period.

FIG. 4 shows an exemplary assignment of access categories to the plurality of contention periods 64. In this example, each different access category is assigned to a different contention period 64. For example, voice traffic, video traffic, background traffic, and best-effort traffic are each assigned to a different contention period. Voice traffic flows contend during contention period CP1, video traffic flows contend during contention period CP2, background traffic flows contend during contention period CP3, and best-effort traffic flows contend during contention period CP4. In addition, the contention periods 64 are scheduled, for example, in round-robin fashion, here denoted as CP1, followed by CP2, CP3, and then CP4, which repeats every subsequent round. Examples of other scheduling mechanisms that can be used include, but are not limited to, weighted round robin (WRR) scheduling and strict priority (SP) scheduling.

This particular exemplary assignment of access categories to contention periods achieves traffic isolation among the different access categories. During each contention period, contention for the wireless channel occurs between traffic flows associated with only one access category, i.e., the access category assigned to that contention period. For example, during the contention period CP4, different best-effort traffic flows originating from different stations contend against each other for the wireless channel, but not against voice, video, or background traffic flows. Such traffic isolation ensures that every type of classified traffic flow obtains some bandwidth of the wireless channel. Thus, high-priority traffic, such as voice, cannot perpetually prevent or significantly delay low-priority traffic, such as best effort traffic, from gaining access to the wireless channel. In addition, because here each contention period is of equal duration, each type of traffic flow can gain access to the wireless channel for the same duration as every other type of traffic flow, thus negating any priority level difference among the access categories.

Figure 5:
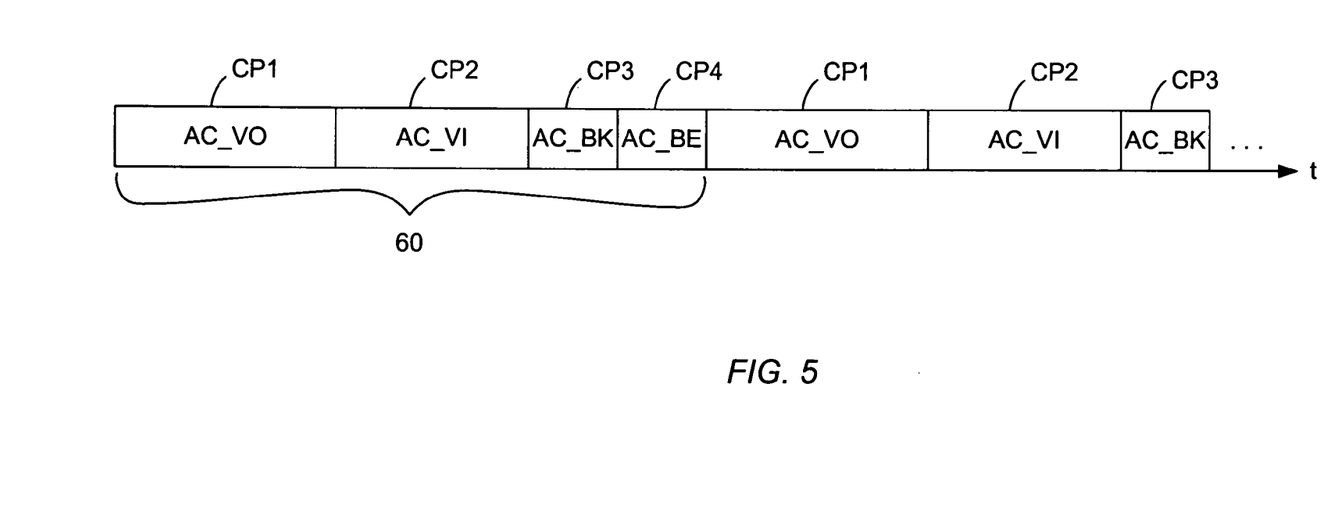
FIG. 5 is a diagram illustrating an exemplary assignment of access categories to contention periods of different durations, with one access category being assigned to each contention period.

FIG. 5 shows the exemplary assignment of access categories to the class-based contention periods of FIG. 4, but for which the contention periods are of different durations. Differentiated throughput and delays for the different access categories can be achieved by using contention periods of different lengths, as illustrated in FIG. 3B. In this example, the contention periods CP1 and CP2 are longer in duration than the contention periods CP3 and CP4, thus giving longer opportunities to transmit voice and video traffic, which are delay-sensitive communications, than to background and best-effort traffic.

Figure 6:
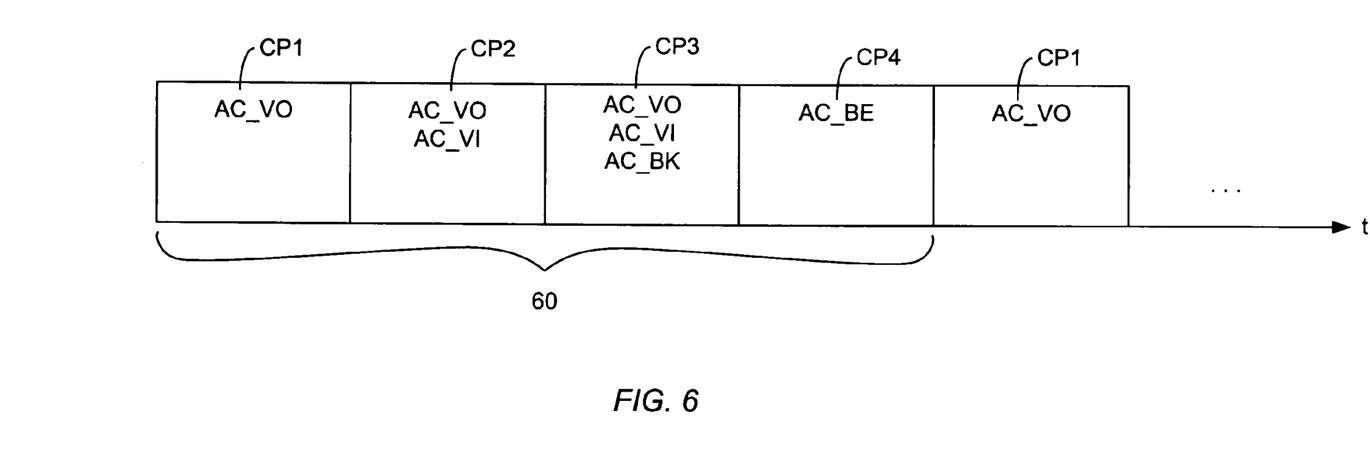
FIG. 6 is a diagram illustrating an exemplary assignment of access categories to contention periods of equal duration, with one or more access categories being assigned to each contention period.

FIG. 6 shows another example of access category assignments, in which certain access categories are assigned to more than one contention period. Assigning access categories to multiple contention periods can operate, in effect, to prioritize among the various classes of traffic. For example, in FIG. 6, the voice-traffic access category is assigned to three contention periods, CP1, CP2, and CP3, and the video-traffic access category is assigned to two contention periods, CP2 and CP3. Accordingly, voice traffic has the greatest opportunity among the classes of traffic to gain access to the wireless channel and video traffic has the second greatest opportunity. Background traffic and best-effort traffic each have only one contention period in which to gain access to the wireless channel.

Traffic flows associated with access categories that are assigned to the same given contention period contend for the bandwidth of the wireless channel during that contention period. When during a given contention period, traffic flows of different access categories are contending for the wireless channel, with high probability the traffic flow with the higher or highest priority obtains access.

In the example shown in FIG. 6, a proper subset of the access categories, i.e., less than all access categories, contend for the wireless transmission medium during each contention period. For example, in contention period CP3, background traffic contends internally and externally with voice traffic and video traffic. Since voice and video traffic are each considered to be of higher priority than background data traffic, background data traffic loses when there is contention. In contrast, traffic associated with the best-effort access category does not contend with any other access category, and thus is ensured access to the wireless channel during its contention period CP4. As a result, in this example there is a greater guarantee of best-effort traffic gaining access to the wireless channel than of background traffic.

Figure 7:
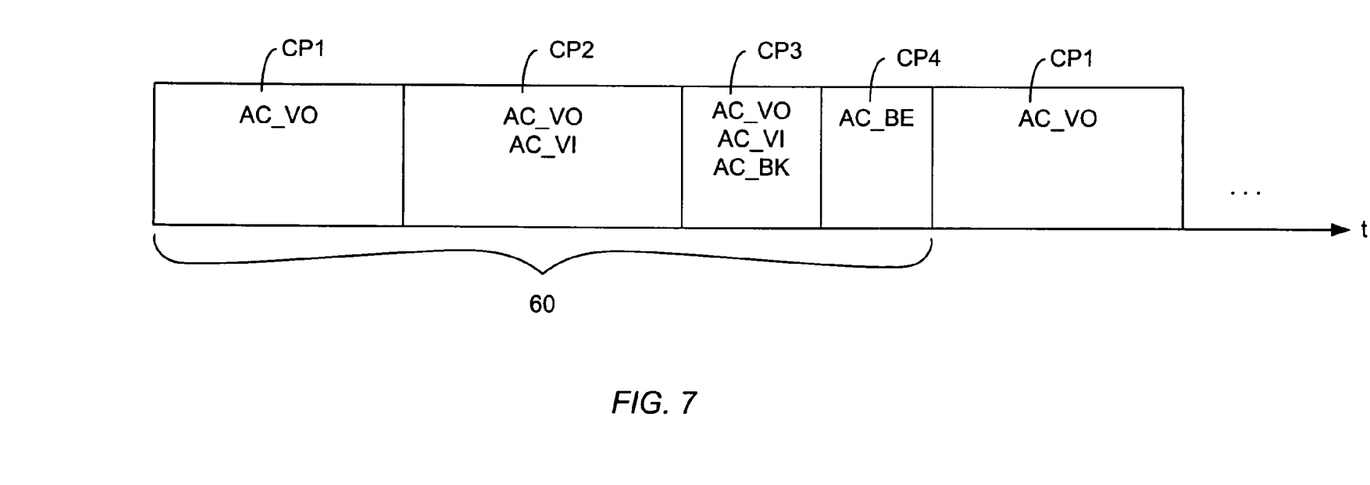
FIG. 7 is a diagram illustrating an exemplary assignment of access categories to contention periods of different durations, with one or more access categories being assigned to each contention period.

FIG. 7 shows the exemplary access category assignments of FIG. 6, using contention periods of different durations as shown in FIG. 3B. This example illustrates the combined use of the above-described prioritizing mechanisms (i.e., different contention period lengths, assignment of access categories to more than one contention period) to achieve differentiated throughput and delays for different access categories and to guarantee a portion of the wireless channel for a particular class of traffic (here AC_BE).

Figure 8:
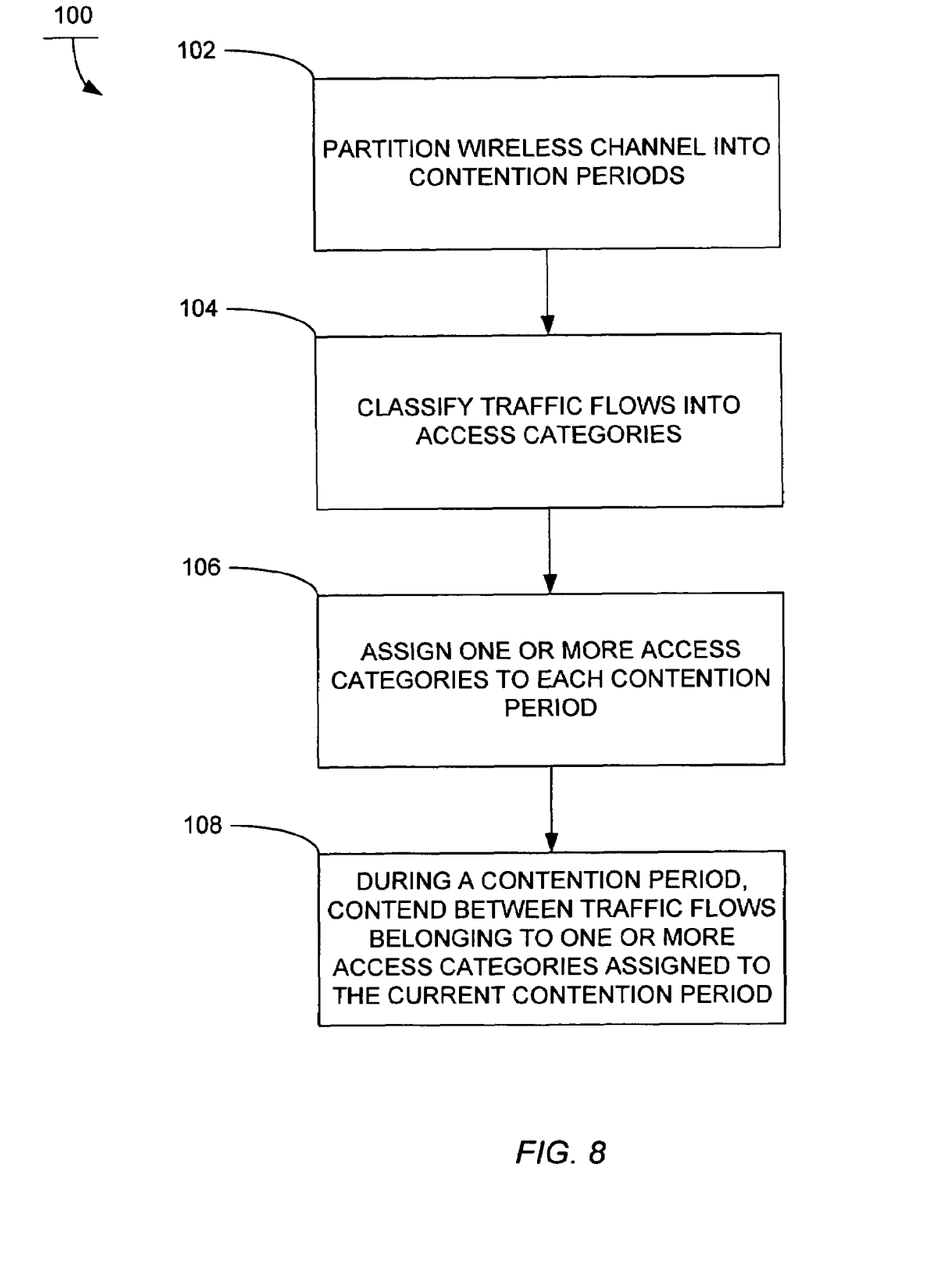
FIG. 8 is a flow diagram of an embodiment of a process for provisioning QoS using class-based contention periods.

FIG. 8 shows an embodiment of a process 100 for allocating the bandwidth of a wireless channel to different types of traffic. No specific order is intended by the order in which the steps of the process are described. At step 102, the bandwidth of the wireless channel is partitioned into a plurality of class-based contention periods. At step 104, traffic flows are classified into access categories. The access categories can have different levels of priority associated therewith, e.g., corresponding to the delay sensitivities of the traffic flows. One or more access categories are assigned (step 106) to each contention period. Some contention periods can have only one access category, other contention periods can have multiple access categories. A scheduling mechanism determines the order in which the contention periods occur. During a given contention period, traffic flows associated with the one or more access categories assigned to that contention period contend (step 108) for access to the wireless channel. The station that wins the contention gains an opportunity to transmit one or more frames of its traffic flow over the wireless channel during the contention period.

The optimal duration for a contention period for each access category depends upon the required data transmission time (or NAV). The minimum duration of the contention period cannot be smaller then the required data transmission time of a frame. Packet size affects the required data transmission time: larger packet sizes require longer data transmission times. Other factors influencing the design of a contention period can include, but not be limited to, network size (i.e., number of nodes), traffic profile, including the source and destination of traffic flows, traffic load, and services required for each traffic flow, e.g., the maximum delay and maximum data rate loss allowed.

In one embodiment, the duration of the contention periods and the scheduling mechanism applied to the contention periods are fixed or static, that is, such parameters do not change throughout the operation of the various stations and access points in the wireless networking environment. In other embodiments, the duration of one or more contention periods, the scheduling mechanism, or combinations thereof, can be changed dynamically during network operation in order to satisfy the expected performance of serviced access categories in a networking environment in which the load conditions vary over time.

Figure 9:
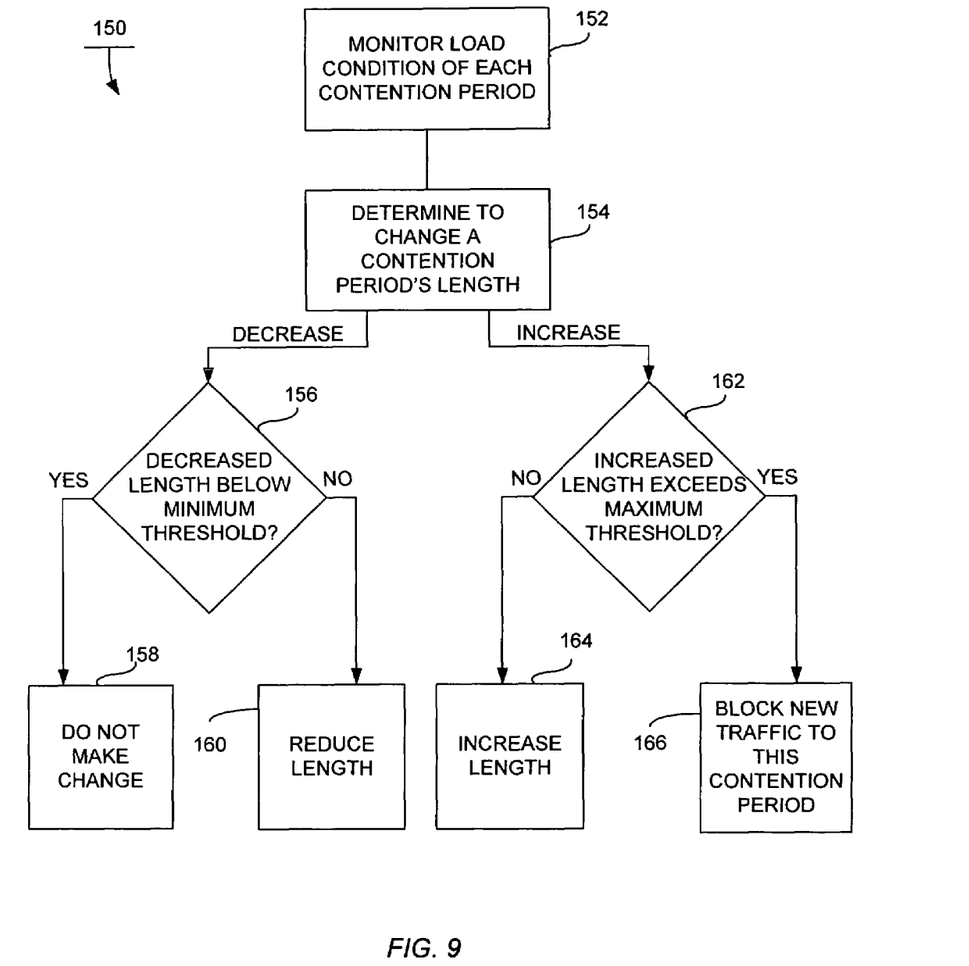
FIG. 9 is a flow diagram of an embodiment of a process for optimizing the allocation of bandwidth of a wireless channel to contending traffic flows.

FIG. 9 shows an embodiment of a process 150 for optimizing the allocation of bandwidth of a wireless channel to contending traffic flows by adaptively changing the duration of one or more contention periods, the scheduling mechanism, or combinations thereof, based on a network current operating condition. During one or more scheduling rounds, the access point monitors (step 152) the loading condition of each contention period. The access point can determine the loading condition of a contention period based on various types of information related to the PHY layer, MAC layer, and network traffic. Such information can include, but not be limited to, the busy or free status of the wireless medium, a successful transmission of a frame, traffic flow and service requirements, packet size for the access category associated with the contention period, packet loss, packet delay, and buffer fill information. From this information, the access point determines (step 154) whether to change the length of each contention period. For example, the access point can increase the length of a heavily loaded contention period and reduce the length of a lightly loaded contention period.

If a determination is made to reduce the length of a contention period, the access point determines (step 156) whether making such a reduction would cause the length to fall below a minimum threshold. Service level agreements can established this minimum threshold below which the length of a given contention period is not permitted to be reduced. Service level agreements can also specify that higher minimum thresholds for high-priority contention periods than for low-priority contention periods. If the change would cause the length of the contention period to fall below the minimum threshold, the access point does not make the change (step 158); otherwise, the reduction occurs (step 160).

If a determination is made to increase the length of a contention period, the access point determines (step 162) whether making such an increase would cause the length to exceed below a maximum threshold. If an increased length is still below this maximum threshold, the access point makes (step 164) the change. When the length of a contention period reaches the specified maximum, and the contention period remains heavily loaded, the access point can refuse admission (step 166) of new traffic to the contention period.

Instead of or in addition to changing the duration of the contention periods, the access point can change the scheduling mechanism used to determine the order of the contention periods. The changes to the durations of the contention periods and to the scheduling mechanism can remain in effect for a short period (e.g., one scheduling round) or for a long period (e.g., over multiple scheduling rounds).

For purposes of illustrating the process 150, consider the following examples in which the access category assignments and scheduling mechanism (i.e., round robin) correspond to those illustrated in FIG. 4. Consider also that the packet size is the same for each traffic flow, and that the durations of the contention periods are initially the same (e.g., 2×NAV). The following table illustrates which traffic flows may contend for a TXOP during each contention period:

TABLE 2

| Contention period | Period | Contending access categories | Associated queue |
|---|---|---|---|
| CP1 | $0 \leq t < 2 * NAV$ | AC_VO | q[0] |
| CP2 | $2 * NAV \leq t < 4 * NAV$ | AC_VI | q[1] |
| CP3 | $4 * NAV \leq t < 6 * NAV$ | AC_BK | q[2] |
| CP4 | $6 * NAV \leq t < 8 * NAV$ | AC_BE | q[3] |
| CP1 | $8 * NAV \leq t < 10 * NAV$ | AC_VO | q[0] |

The following example contrasts static class-based contention periods with adaptive class-based contention periods. Consider that during the contention period CP1, at time t1, where NAV<t1<2*NAV, the access point receives an ACK while a data packet, d1, is in the transmission queue q[0]. When contention periods are static, the access point does not transmit the data packet, d1, because the time remaining in the contention period CP1 is less than the amount of time needed to transmit the data packet (i.e., 1*NAV). Consequently, the access point waits until the start of the next contention period CP2 to schedule a possible data transmission for access category AC_VI. Thus, a portion of the bandwidth (here, 2*NAV−t1) goes unused.

When adaptive class-based contention periods are used, instead of waiting until the start of the contention period CP2, the access point can update and advertise a revised access category (AC_VI) that now starts at time t1. The access point can then schedule the possible data transmission for access category AC_VI at time t1, not at 2*NAV. In effect, the access point dynamically changes the length of the contention period CP2, in response to a PHY status, rather than allow a portion of the channel bandwidth to go unused.

In another example that contrast static and adaptive class-based contention periods, consider that at time t1 (during contention period CP1), where NAV<t1<2*NAV, the MAC transmission queue status is as follows: queue q[0] has 10 packets, and queues q[1], q[2], and q[3] each have no packets. The access point transmits as many packets in q[0] as possible during contention period CP1—which, for the purposes of this example, is fewer than 10 packets. For static class-based contention periods, no transmissions occur until the next occurrence of the contention period CP1 because there are no packets in any of the other queues. For a round robin scheduling mechanism and four access categories, the elapsed time for each scheduled round is 8*NAV (i.e., 4*2*NAV). Thus, bandwidth amounting to a duration of 8*NAV−t1 goes unused.

When class-based contention periods are adaptive, instead of waiting until the next occurrence of the contention period CP1, the access point continuously advertises the same access category (AC_VO) based on the status of the various transmission queues. Thus, the round-robin scheduling mechanism does not dictate the behavior of the access point, i.e., the access point can alter the scheduling of the contention periods. Alternatively, the access point can lengthen the duration of the contention period CP1 and shorten the duration of the three other contention periods CP2, CP3, and CP4, not being restricted by a fixed contention period duration. Therefore, data transmission for q[0] (i.e., AC_VO) can continue at time t1, rather than wait until time 8*NAV.

Changes to the durations of the contention period, to the scheduling mechanism, or to both can occur in response to other types of network conditions than those previously described. For example, changes can be made in response to service requirements; for a time-sensitive application, the access point can reduce the length of the contention period, switch to a strict priority scheduling mechanism, or do both.

As another example, changes can be made in response to traffic load. For example, the access point can lengthen the duration of a contention period for an access category experiencing heavy traffic load, or change the scheduling mechanism to a weighted round robin scheme, with more weight being assigned the access category with the heavy traffic load, or make both types of changes.

As additional examples, changes can be made based on packet size, packet latency, and packet loss rate. The access point can lengthen a contention period for an access category that employs large packets, shorten a contention period for an access category experiencing high packet latency, and lengthen the length of a contention period for an access category experiencing high packet loss rate.

Although the invention has been shown and described with reference to specific preferred embodiments, it should be understood by those skilled in the art that various changes in form and detail may be made therein without departing from the spirit and scope of the invention as defined by the following claims.

What is claimed is:

1. In a wireless network, a method of allocating bandwidth of a wireless channel to different types of traffic, the method comprising:
    partitioning bandwidth of the wireless channel into a plurality of contention periods;
    associating traffic flows with access categories;
    assigning one or more of the access categories to each contention period; and
    contending for access to the wireless channel by traffic flows associated with a proper subset of the access categories during at least one of the contention periods.

2. The method of claim 1, further comprising the step of dynamically adjusting a duration of one of the contention periods.

3. The method of claim 2, wherein the step of dynamically adjusting includes increasing the duration of that one contention period when the contention period is experiencing heavy traffic.

4. The method of claim 2, wherein the step of dynamically adjusting includes decreasing the duration of that one contention period.

5. The method of claim 1, further comprising the step of dynamically changing a scheduling mechanism used to sequence the contention periods.

6. The method of claim 1, wherein the step of assigning includes assigning a high-priority access category to a greater number of contention periods than a low-priority access category.

7. The method of claim 1, further comprising the step of assigning a longer duration to one contention period than to another contention period.

8. The method of claim 1, wherein the step of associating includes associating one access category with data traffic, and wherein the step of assigning includes assigning only the data traffic access category to one contention period to ensure transmission of data traffic during each scheduled round.

9. The method of claim 1, further comprising the step of resolving contention between traffic flows according to a modified Enhanced Distributed Channel Access (EDCA) protocol.

10. The method of claim 9, further comprising the steps of sensing that the wireless channel is busy and decrementing a back-off counter although the wireless channel is sensed busy.

11. A wireless network, comprising:
    a station for transmitting packets over a wireless medium; and
    an access point in wireless communication with the station over the wireless medium, the access point executing software to (1) partition the bandwidth of the wireless medium into a plurality of contention periods, (2) associate traffic flows with access categories, and (3) assign one or more of the access categories to each contention period such that during at least one of the contention periods traffic flows associated with a proper subset of the access categories contend for access to the wireless medium.

12. The wireless network of claim 11, further comprising software executable by the access point to adjust dynamically a duration of one of the contention periods.

13. The wireless network of claim 11, further comprising software executable by the access point to change dynamically a scheduling mechanism used to sequence the contention periods.

14. The wireless network of claim 11, further comprising software executable by the access point to assign a high-priority access category to a greater number of contention periods than a low-priority access category.

15. The wireless network of claim 11, further comprising software executable by the access point to assign a longer duration to at least one contention period than to another contention period.

16. An access point for use in a wireless network, comprising:
    a processing unit; and
    software executable by the processing unit to (1) partition the bandwidth of the wireless medium into a plurality of contention periods, (2) associate traffic flows with access categories, and (3) assign one or more of the access categories to each contention period such that during at least one of the contention periods traffic flows associated with a proper subset of the access categories contend for access to the wireless medium.

17. The access point of claim 16, further comprising software executable by the processing unit to adjust dynamically a duration of one of the contention periods.

18. The access point of claim 16, further comprising software executable by the processing unit to change dynamically a scheduling mechanism used to sequence the contention periods.

19. The access point of claim 16, further comprising software executable by the processing unit to assign a high-priority access category to a greater number of contention periods than a low-priority access category.

20. The access point of claim 16, further comprising software executable by the processing unit to assign a longer duration to at least one contention period than to another contention period.

* * * * *